2,810,707

MOLDING COMPOSITIONS OF ALKENYL AROMATIC RESINS AND COPOLYMERS OF BUTADIENE AND A MONOVINYL AROMATIC HYDROCARBON AND METHOD OF MAKING THE SAME

Floyd B. Nagle, Midland, Mich., assignor to The Dow Chemical Company, Midland, Mich., a corporation of Delaware No Drawing. Application January 27, 1954, Serial No. 406,576

12 Claims. (Cl. 260—45.5)

This invention concerns molding compositions comprising an alkenyl aromatic resin and a polymer of an unsaturated diolefin containing ethylenic unsaturation, together with certain agents for stabilizing the compositions against deterioration upon exposure to light and oxygen.

Matheson et al., in U. S. Patent No. 2,287,188, describe a method for stabilizing vinyl aromatic resins against discoloring by light wherein a small proportion of an organic amine having an ionization constant greater than $10^{-9}$ and boiling at a temperature above 200° C. at atmospheric pressure is incorporated with a vinyl aromatic resin such as polystyrene.

It has been observed that a composition comprised of an intimate mixture of a major proportion of an alkenyl aromatic resin, such as polystyrene and a minor proportion of a polymer of an unsaturated diolefin containing ethylenic unsaturation in the polymer molecule, e. g. a copolymer of butadiene and styrene, has a tendency to deteriorate in the presence of oxygen and heat or light, with resultant lowering of one or more of the mechanical properties, and particularly with rapid loss of the percent elongation value for the composition. Such deterioration is accelerated in air at elevated temperatures, or by direct exposure to sunlight, or ultraviolet light.

It is a primary object of the invention to provide thermoplastic compositions comprised of an alkenyl aromatic resin and a minor proportion of a polymer of an unsaturated diolefin containing ethylenic unsaturation, which compositions are stabilized against deteriorating in the presence of air or oxygen and heat, or light. Another object is to provide agents suitable for stabilizing compositions comprised of a major proportion of an alkenyl aromatic resin and a minor proportion of a polymer of an unsaturated diolefin containing ethylenic unsaturation, against the deteriorating effects produced by exposure to air or oxygen and heat, or light. Still another object is to provide molding compositions comprised of a thermoplastic alkenyl aromatic resin and a minor proportion of a copolymer of styrene and butadiene, together with a stabilizing agent for preventing rapid deterioration of the percent elongation value for the composition in the presence of air or oxygen and heat, or light. Other and related objects may appear from the following description of the invention.

According to the invention molding compositions comprised of a major proportion of an alkenyl aromatic resin and a minor proportion of a polymer of an unsaturated diolefin containing ethylenic unsaturation can readily be stabilized against the deteriorating effects produced by air or oxygen and heat, or light, by incorporating a tetra-alkyldiamino-2-propanol having the general formula:

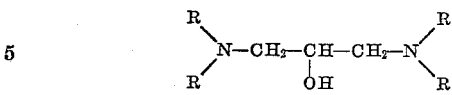

wherein R is independently selected from the group consisting of the methyl and ethyl radicals, with the composition. Examples of suitable tetra-alkyldiamino-2-propanols are tetra-methyldiamino-2-propanol, tetra-ethyldiamino-2-propanol or diethyl-dimethyldiamino-2-propanol.

The tetra-alkyldiamino-2-propanol compound is usually employed in amount corresponding to from 0.5 to 4 preferably from 1 to 2 percent by weight of the composition.

As the alkenyl aromatic resin starting material for making the compositions there may be employed one or more thermoplastic polymers containing in chemically combined form at least 70 percent by weight of a monovinyl aromatic hydrocarbon or a nuclear halogenated derivative thereof, or copolymers of at least one such monovinyl aromatic compound and 30 percent by weight or less of a different mono-alkenyl aromatic hydrocarbon, e. g. an alpha-alkylvinyl aromatic compound such as alpha-methylstyrene. Polymers of one or more monovinyl aromatic compounds such as styrene, vinyltoluene, vinylxylene, ar-ethylvinylbenzene, ar-isopropylstyrene, chlorostyrene, dichlorostyrene, or ar-ethylvinyltoluene, or copolymers of a predominant proportion of at least one such monovinyl aromatic compound and from 1 to 30 percent by weight of a mono-alkenyl aromatic hydrocarbon such as alpha-methylstyrene, para-methyl-alpha-methylstyrene, or alpha-ethylstyrene are preferred.

The term "alkenyl aromatic resin" employed herein refers to polymers of mono-alkenyl aromatic compounds containing in chemically combined form at least 70 percent by weight of one or more monovinyl aromatic hydrocarbons of the benzene series, or nuclear halogenated derivatives thereof, including copolymers of up to 30 percent by weight of an alpha-alkyl-vinyl aromatic hydrocarbon such as alpha-methylstyrene, para-methyl-alpha-methylstyrene, or alpha-ethylstyrene.

The polymer of an unsaturated diolefin containing ethylenic unsaturation to be employed as starting material is preferably a copolymer containing in chemically combined form from 30 to 70 percent by weight of butadiene and from 70 to 30 percent of a monovinyl aromatic hydrocarbon of the benzene series such as styrene, or ortho-, meta-, or para-vinyltoluene. Such copolymers are usually rubbery elastomers containing ethylenic unsaturation. They may be prepared in usual ways, e. g. by polymerizing a mixture of the monomeric ingredients in an aqueous emulsion and coagulating and separating the polymer from the aqueous liquid. In an alternate procedure, the polymer of an unsaturated diolefin containing ethylenic unsaturation may be obtained from a synthetic latex formed by the copolymerization of a mixture of butadiene and styrene in an aqueous emulsion and thereafter drying the latex by evaporating the water in usual ways, e. g. on heated rolls or in vacuum. Mixtures of two or more synthetic latexes of different compositions, but each prepared by polymerizing a mixture of butadiene and styrene or vinyltoluene in proportions corresponding to from 30 to 70 percent by weight of the butadiene and from 70 to 30 percent by weight of the monovinyl aromatic hydrocarbon, may also be used. Small amounts of plasticizing agents such as butyl stearate, soybean oil, or a white mineral oil, or pigments dyes, antioxidants, stabilizers, or modifying agents can conveniently be incorporated with the polymer by dispersing or dissolving the same in the latex, prior to evaporating the water.

Molding compositions comprising the thermoplastic alkenyl aromatic resins and a polymer of an unsaturated diolefin containing ethylenic unsaturation can be prepared by heat-plastifying the polymeric components and mechanically working the same to form a homogeneous composition. The molding compositions with which the invention is concerned are obtained by heat-plastifying and mechanically working from 50 to 80 parts by weight of a thermoplastic alkenyl aromatic resin, e. g. polystyrene, and from 50 to 20 parts of a copolymer containing in chemically combined form from 30 to 70 percent by weight of butadiene and from 70 to 30 percent of styrene, or vinyltoluene, and from 0.5 to 4 percent by weight of a tetra-alkyldiamino-2-propanol having the aforementioned general formula, to yield a uniform composition. The ingredients are usually heat-plastified and intimately admixed with one another at temperatures between 150° and 250° C.

In practice, the alkenyl aromatic resin, e. g. polystyrene, and the polymer of butadiene containing ethylenic unsaturation, are heat-plastified and mechanically worked by milling the same on compounding rolls, or by kneading in a Banbury mixer, in the desired proportions to form a substantially uniform composition. The tetra-alkyldiamino-2-propanol is added, preferably in small portions, and is intimately incorporated with the polymeric ingredients while mechanically working the heated materials to obtain a substantially uniform composition. Thereafter, the composition is cooled and cut or ground to a granular form suitable for molding.

Small amounts of liquid plasticizing agents having a boiling point of 200° C. or higher such as soybean oil, white mineral oil, or butyl stearate may be incorporated with the compositions in amount corresponding to from 0.25 to 4 percent by weight.

The following examples illustrate ways in which the principle of the invention has been applied, but are not to be construed as limiting the scope.

Example 1

In each of a series of experiments, a charge of 195 grams of a batch of molding grade polystyrene was heat-plastified by milling the same on a pair of 3-inch diameter by 8-inches long internally heated compounding rolls. One of the rolls was heated to a temperature of 325° F., and the other roll was heated at a temperature of from 230° and 240° F. After heat-plastifying the polystyrene on the rolls, 105 grams of a batch of a synthetic rubber, containing in chemically combined form 55 percent by weight styrene and 45 percent butadiene, was added. The mixture was mechanically worked on the heated rolls for about 6 minutes to obtain a uniform composition. Thereafter, tetra-methyldiamino-2-propanol was added in the amount stated in the following table. The resulting mixture was milled on the heated rolls for a period of approximately 2 minutes, then removed and allowed to cool to room temperature. A portion of each composition was injection molded to form test bars of ⅛ x ½ inch cross section by 4 inches long. These test bars were used to determine a percent elongation value for the composition. The procedure for determining the percent elongation was similar to that described in ASTM D638–44T. A percent elongation value for the composition was determined on test bars as initially molded and on test bars after exposure in air to rays of an S-4 General Electric sun lamp for a period of 24 hours at room temperature. The table identifies the compositions by giving the parts by weight of the ingredients from which they were prepared. The table also gives an initial percent elongation value, a percent elongation value after exposure of test bars to rays of the sun lamp for a period of 24 hours and the percent loss of elongation. For purpose of comparison a composition of the polystyrene and the rubbery copolymer of styrene and butadiene in similar proportions, but without a stabilizing agent, was prepared and tested under similar conditions, and the results included in the table.

| Run No. | Starting Materials | | | Composition | | |
|---|---|---|---|---|---|---|
| | Polystyrene, gms. | Copolymer, gms. | Tetra-methyldiamino-2-propanol, gms. | Percent Elongation | | |
| | | | | Initial | After Aging | Loss |
| 1 | 195 | 105 | 0 | 23.3 | 2.2 | 90.6 |
| 2 | 195 | 105 | 1.5 | 25.8 | 13.1 | 49.2 |
| 3 | 195 | 105 | 3.0 | 26.2 | 15.2 | 42.0 |
| 4 | 195 | 105 | 4.5 | 23.0 | 17.3 | 25.0 |
| 5 | 195 | 105 | 6.0 | 24.5 | 16.6 | 32.0 |
| 6 | 195 | 105 | 9.0 | 23.8 | 14.0 | 41.0 |
| 7 | 195 | 105 | 12.0 | 20.0 | 13.2 | 34.0 |

Example 2

A charge of 195 grams of a batch of molding grade polystyrene and 105 grams of the batch of the synthetic rubber described in Example 1, was heat-plastified and milled to a uniform composition on the rolls described in the previous example. Three grams of tetra-ethyldiamino-2-propanol was added and dispersed in the heated composition by milling for another 2 minutes. The composition was removed from the rolls and allowed to cool to room temperature. Molded test bars of the composition were used to determine a percent elongation value by procedure similar to that employed in Example 1. Test bars of the composition as initially molded had an elongation value of 34.2 percent. After exposure in air to rays of an S-4 sun lamp for 24 hours, test bars of the composition had an elongation value of 21.9 percent.

Example 3

A charge of 192 grams of a batch of polyvinyltoluene, prepared by polymerizing a mixture of approximately 65 percent by weight of meta-vinyltoluene and 35 percent para-vinyltoluene in bulk and having a viscosity characteristic (i. e. the viscosity of a 10 percent by weight solution of the polymer in toluene) of 24.2 centipoises at 25° C., was heat-plastified by milling the same on the laboratory rolls described in Example 1, heated at temperatures of 220° F. and 330° F., respectively. Thereafter, 105 grams of latex solids comprising a copolymer of 60 percent by weight styrene and 40 percent butadiene containing 1 percent by weight of butyl stearate, and 1 percent of polyethylene glycol having an average molecular weight of 600, based on the weight of the copolymer, was added to the heat-plastified polyvinyltoluene. The resulting mixture was compounded on the heated rolls for 6 minutes. Three grams of tetra-methyldiamino-2-propanol was added and dispersed in the heated composition by milling for 2 minutes, after which the composition was removed from the rolls and cooled to room temperature. The latex solids employed in the experiment were obtained by dispersing the butyl stearate and the polyethylene glycol in a portion of a batch of a synthetic latex, previously prepared by polymerizing a mixture of 60 percent by weight of styrene and 40 percent of butadiene in an aqueous emulsion to form an aqueous colloidal dispersion containing 48 percent by weight of the copolymer, and drying the so-treated latex containing the added ingredients on an internally steam heated roll at a temperature of 150° C. The composition of the polyvinyltoluene and the copolymer of styrene and butadiene containing the tetra-methyldiamino-2-propanol was crushed to a granular form. Portions of the composition were injection molded to form test bars of ⅛ x ½ inch cross section by 4 inches long. The test bars were used to determine a percent elongation value for the composition, as in Example 1. The composition had an elongation value of 19.5 percent, determined on test bars as initially molded. After exposure to rays of the S–4 sun lamp in air for 24 hours, test bars of the composition had an elongation value of 15.8 percent. The loss in percent elongation was only 19 percent.

In contrast, an unstabilized batch of a polyvinyltoluene and latex solids composition similar to the above intermediate composition (i. e. comprising the same copolymer of styrene and butadiene, together with 1 percent by weight of butyl stearate and 1 percent of polyethylene glycol having an average molecular weight of 600) was prepared and tested under similar conditions. It was found to have an elongation value of 21.6 percent, determined on test bars as initially molded. After exposure of molded test bars of the unstabilized composition to rays of an S–4 sun lamp for 24 hours, the composition had an elongation value of only 1.5 percent. The loss in percent elongation was 93 percent.

*Example 4*

A charge of 192 grams of a batch of a copolymer of 70 percent by weight styrene and 30 percent alpha-methylstyrene, was heat-plastified and compounded with 105 grams of the batch of the latex solids described in Example 3. Three grams of tetra-methyldiamino-2-propanol was added as stabilizing agent. Molded test bars of the composition were prepared and tested by procedure similar to that employed in Example 1. The composition had an initial elongation value of 21.7 percent. After exposure of test bars to rays of an S–4 sun lamp for 24 hours, the composition had an elongation value of 14.7 percent. The loss in elongation value was only 33 percent.

In contrast, a composition containing similar proportions of the ingredients, but no tetra-methyldiamino-2-propanol, prepared and tested under similar conditions, was found to have an initial elongation value of 22.9 percent. After exposure of molded test bars of the unstabilized composition to rays of an S–4 sun lamp for 24 hours, the composition had an elongation value of only 1.3 percent. The loss in percent elongation was 94 percent.

*Example 5*

A charge of 237 grams of a batch of a copolymer of 70 percent by weight styrene and 30 percent alpha-methylstyrene was heat-plastified by milling the same on the laboratory rolls described in Example 1, heated at temperatures of 230° F. and 330° F., respectively. Thereafter, 60 grams of dried latex solids comprising a copolymer of 70 percent by weight of butadiene and 30 percent of styrene, containing 1 percent by weight of butyl stearate and 1 percent of polyethylene glycol having a molecular weight of 600, was added. The mixture was milled for 8 minutes on the heated rolls after which 3 grams of tetra-methyldiamino-2-propanol was added and dispersed in the heated composition by milling for approximately two minutes longer. The composition was removed from the rolls, cooled and crushed to a granular form. Molded test bars of the composition were prepared and tested by procedure similar to that employed in Example 1. The composition had an elongation value of 15 percent determined on test bars as initially molded. After exposure of test bars to rays of an S–4 sun lamp for 24 hours, the composition had an elongation value of 6.5 percent.

*Example 6*

A charge of 168 grams of a batch of a solid copolymer of 70 percent by weight of styrene and 30 percent alpha-methylstyrene was heat-plastified by milling the same on the rolls described in Example 1, heated at temperatures of 230° F. and 330° F., respectively. Thereafter, 129 grams of a batch of dried latex solids comprising a copolymer of 66 percent by weight styrene and 34 percent butadiene, together with 1 percent by weight of butyl stearate and 1 percent of polyethylene glycol was added to the heat-plastified copolymer of styrene and alpha-methylstyrene. The resulting mixture was milled on the heated rolls and 3 grams of tetra-methyldiamino-2-propanol incorporated therewith. The composition was removed from the rolls, cooled and crushed to a granular form. Molded test bars of the composition were tested by a procedure similar to that employed in Example 1. The composition had an elongation value of 37.2 percent determined on test bars as initially molded. After exposure of molded test bars to rays of an S–4 sun lamp for 24 hours, the composition had an elongation value of 24.6 percent.

In contrast, a composition prepared from similar proportions of the ingredients, i. e. the copolymer, the dried latex solids together with the butyl stearate and polyethylene glycol, but no tetra-methyldiamino-2-propanol, under similar compounding conditions was found to have an elongation value of 40.2 percent, determined on test bars as initially molded. After exposure of test bars to rays of an S–4 sun lamp for 24 hours, the unstabilized composition had an elongation value of only 2.1 percent.

*Example 7*

A charge of 192 grams of a batch of a granular copolymer of 70 percent by weight of styrene and 30 percent alpha-methylstyrene was heat-plastified by milling the same on the pair of laboratory rolls described in Example 1, heated at temperatures of 220° F. and 330° F., respectively. Thereafter, 105 grams of a batch of a rubbery copolymer containing in chemically combined form 60 percent by weight of styrene and 40 percent of butadiene was added, together with 3 grams of tetra-methyldiamino-2-propanol. The rubbery copolymer employed in the experiment was obtained by drying a synthetic latex, i. e. an aqueous colloidal dispersion of the rubbery copolymer, on hollow rolls internally heated to a temperature of 150° C. and scraping the coating of dried latex solids therefrom as flakes or shreds. The mixture of ingredients was milled on the heated rolls for 8 minutes, then removed and allowed to cool. The composition was crushed to a granular form. Molded test bars of ⅛ x ½ inch cross section were prepared from the composition. A percent elongation value for the composition was determined on test bars as initially molded and on test bars after exposure to rays of an S–4 sun lamp for 24 hours. The composition had an elongation value of 16.3 percent, determined on test bars as initially molded. After exposure of test bars to rays of an S–4 sun lamp for 24 hours, the composition had an elongation value of 13.1 percent. The loss in elongation value was only 20 percent.

In contrast, a composition of similar proportions of the copolymer of styrene and alpha-methylstyrene and the rubbery copolymer of styrene and butadiene, but no tetra-methyldiamino-2-propanol, prepared under similar compounding conditions was found to have an elongation value of 17.3 percent, determined on test bars of the composition as initially molded, and an elongation value of only 1.9 percent after exposure of test bars to rays of an S–4 sun lamp for 24 hours in air. The loss in percent elongation value for the unstabilized composition was 89 percent.

I claim:

1. A thermoplastic composition composed of a heat-plastified and mechanically worked mixture of ingredients comprising from 50 to 80 percent by weight of a thermoplastic alkenyl aromatic resin consisting of polymerized alkenyl aromatic monomeric material at least 70 percent by weight of which monomeric material consists of at least one monovinyl aromatic compound, and from 50 to 20 percent of a synthetic rubbery polymer containing in chemically combined form from 30 to 70 percent by weight of butadiene and from 70 to 30 percent of a monovinyl aromatic hydrocarbon selected from the group consisting of styrene and vinyl-toluene, said copolymer containing ethylenic unsaturation, and uniformly incorporated with said ingredients, as an agent for stabilizing the composition against deteriorating in the presence of air and light, from 0.5 to 4 percent by weight of a tetra-alkyldiamino-2-propanol having the general formula:

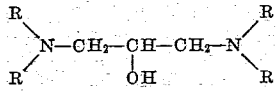

wherein each R is independently selected from the group consisting of of the methyl and ethyl radicals.

2. A composition as claimed in claim 1, wherein the tetra-alkyldiamino-2-propanol is tetra-methyldiamino-2-propanol.

3. A composition as claimed in claim 1, wherein the tetra-alkyldiamino-2-propanol is tetra-ethyldiamino-2-propanol.

4. A composition as claimed in claim 1, wherein the alkenyl aromatic resin is polystyrene.

5. A composition as claimed in claim 1, wherein the alkenyl aromatic resin is polyvinyltoluene.

6. A composition as claimed in claim 1, wherein the alkenyl aromatic resin is a copolymer of from 70 to 99 percent by weight of styrene and from 30 to 1 percent of alpha-methylstyrene.

7. A thermoplastic composition composed of a heat-plastified and mechanically worked mixture of ingredients comprising approximately 65 percent by weight of polystyrene and approximately 35 percent of a copolymer containing in chemically combined form from 30 to 70 percent by weight of butadiene and from 70 to 30 percent of styrene, said copolymer containing ethylenic unsaturation, and uniformly incorporated with said ingredients, as an agent for stabilizing the composition against deteriorating in the presence of air and light, from 0.5 to 4 percent by weight of tetramethyldiamino-2-propanol.

8. A thermoplastic composition composed of a heat-plastified and mechanically worked mixture of ingredients comprising approximately 65 percent by weight of polystyrene and approximately 35 percent of a copolymer containing in chemically combined form from 30 to 70 percent by weight of butadiene and from 70 to 30 percent of styrene, said copolymer containing ethylenic unsaturation, and uniformly incorporated with said ingredients, as an agent for stabilizing the composition against deteriorating in the presence of air and light, from 0.5 to 4 percent by weight of tetra-ethyldiamino-2-propanol.

9. A method which comprises stabilizing a thermoplastic composition composed of a heat-plastified and mechanically worked mixture of ingredients comprising from 50 to 80 percent by weight of a thermoplastic alkenyl aromatic resin consisting of polymerized alkenyl aromatic monomeric material at least 70 percent by weight of which monomeric material consists of at least one monovinyl aromatic compound, and from 50 to 20 percent of a synthetic rubbery copolymer containing in chemically combined form from 30 to 70 percent by weight of butadiene and from 70 to 30 percent of a monovinyl aromatic hydrocarbon selected from the group consisting of styrene and vinyltoluene, said copolymer containing ethylenic unsaturation, against deteriorating in the presence of air and light by intimately admixing the ingredients at a heat-plastifying temperature betwene 150° and 250° C. and incorporating in the mixture from 0.5 to 4 percent by weight of a tetra-alkyldiamino-2-propanol having the general formula:

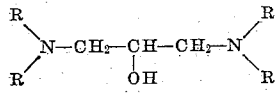

wherein each R is independently selected from the class consisting of the methyl and ethyl radicals.

10. A process as described in claim 9, wherein the tetra-alkyldiamino-2-propanol is tetra-methyldiamino-2-propanol.

11. A process as described in claim 9, wherein the alkenyl aromatic resin is polystyrene.

12. A process as described in claim 9, wherein the alkenyl aromatic resin is polyvinyltoluene.

References Cited in the file of this patent
UNITED STATES PATENTS

| | | |
|---|---|---|
| 1,845,403 | Eisleb | Feb. 16, 1932 |
| 2,287,188 | Matheson et al. | June 23, 1942 |
| 2,578,518 | Ditz et al. | Dec. 11, 1951 |
| 2,681,328 | Stanton et al. | June 15, 1954 |